US010924452B1

(12) United States Patent
Nikolayev et al.

(10) Patent No.: US 10,924,452 B1
(45) Date of Patent: Feb. 16, 2021

(54) AUDITING IP ADDRESS ASSIGNMENTS

(71) Applicant: Amazon Technologies, Inc., Reno, NV (US)

(72) Inventors: Leonid Valentinovich Nikolayev, Fairfax, VA (US); Michael Brooke Furr, Washington, DC (US); Ryan David Murphy, Ashburn, VA (US); Kevin Christopher Miller, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 791 days.

(21) Appl. No.: 14/015,698

(22) Filed: Aug. 30, 2013

(51) Int. Cl.
*H04L 29/12* (2006.01)

(52) U.S. Cl.
CPC ...... *H04L 61/2046* (2013.01); *H04L 61/2038* (2013.01); *H04L 61/20* (2013.01); *H04L 61/2007* (2013.01)

(58) Field of Classification Search
CPC .................................................. H04L 61/2046
USPC .......................................................... 709/245
See application file for complete search history.

(56) References Cited

U.S. PATENT DOCUMENTS

| | | | | |
|---|---|---|---|---|
| 6,092,110 A * | 7/2000 | Maria | ...................... | H04L 29/06 709/225 |
| 6,158,008 A * | 12/2000 | Maria | ...................... | H04L 29/06 713/154 |
| 8,656,026 B1 * | 2/2014 | Prasad | ................ | H04L 61/2015 709/227 |
| 9,544,228 B2 * | 1/2017 | Cheng | .................... | H04L 45/741 |
| 2004/0015607 A1 * | 1/2004 | Bender | ............. | H04L 29/12009 709/238 |
| 2004/0073671 A1 * | 4/2004 | Maria | ...................... | H04L 29/06 709/225 |
| 2005/0022000 A1 * | 1/2005 | Inomata | ................ | G06F 21/552 726/26 |
| 2006/0088037 A1 * | 4/2006 | Finley, Jr. | ........... | H04L 29/12009 370/395.54 |
| 2007/0255848 A1 * | 11/2007 | Sewall | .............. | H04L 29/12066 709/232 |
| 2008/0016311 A1 * | 1/2008 | Harada | ................ | G06F 3/0605 711/170 |
| 2008/0082629 A1 * | 4/2008 | Puthiyaveettil | ... | G06F 17/30873 709/217 |
| 2010/0030876 A1 * | 2/2010 | Perry | .................. | H04L 61/1511 709/221 |
| 2010/0036969 A1 * | 2/2010 | Perry | .................. | H04L 61/1511 709/245 |
| 2010/0049982 A1 * | 2/2010 | Migault | ............ | H04L 29/12066 713/176 |
| 2010/0325425 A1 * | 12/2010 | Park | ...................... | H04W 12/04 713/155 |

(Continued)

*Primary Examiner* — Dhairya A Patel
(74) *Attorney, Agent, or Firm* — BakerHostetler

(57) ABSTRACT

Techniques are disclosed for auditing an IP address prefix that has been assigned to an entity as part of an administrator policy, to determine whether the assignment was implemented on the network. In an embodiment, associations between IP addresses and their assignment are stored in a database. IP addresses are read and semi-authoritative sources (e.g., DNS servers) are queried for information about the IP addresses. Information received in response to the query may be used to validate the IP address (e.g., in a network, all IP addresses used for VM instances will have a corresponding URL in a specific format).

17 Claims, 7 Drawing Sheets

(56) References Cited

U.S. PATENT DOCUMENTS

| | | | | |
|---|---|---|---|---|
| 2011/0099270 A1* | 4/2011 | Hartman | ............... | H04M 1/56 |
| | | | | 709/224 |
| 2012/0219008 A1* | 8/2012 | Lee | ............... | H04L 12/2834 |
| | | | | 370/401 |
| 2012/0278467 A1* | 11/2012 | Schneider | ............ | G06Q 30/02 |
| | | | | 709/223 |
| 2013/0034099 A1* | 2/2013 | Hikichi | ............ | H04L 61/2514 |
| | | | | 370/392 |
| 2014/0283099 A1* | 9/2014 | Smith | ............... | G06F 11/00 |
| | | | | 726/26 |

* cited by examiner

US 10,924,452 B1

AUDITING IP ADDRESS ASSIGNMENTS

BACKGROUND

There are web services platforms that provide compute resources to a plurality of customers. Multiple customers may access a web services platform via a computing node and issue instructions to the web services platform. A web services platform may be called a multi-tenant web services platform to denote that multiple customers may access the platform. In turn, the web services platform may respond to these instructions by performing computing operations on one or more of a plurality of computing nodes that make up the web services platform. In the process of administering a web services platform, an administrator may assign a network address, such as an Internet Protocol (IP) address or an IP address prefix for use in a specific purpose (e.g., for a production network portion of the web services platform), or for use by a particular team of developers that works on the web services platform.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
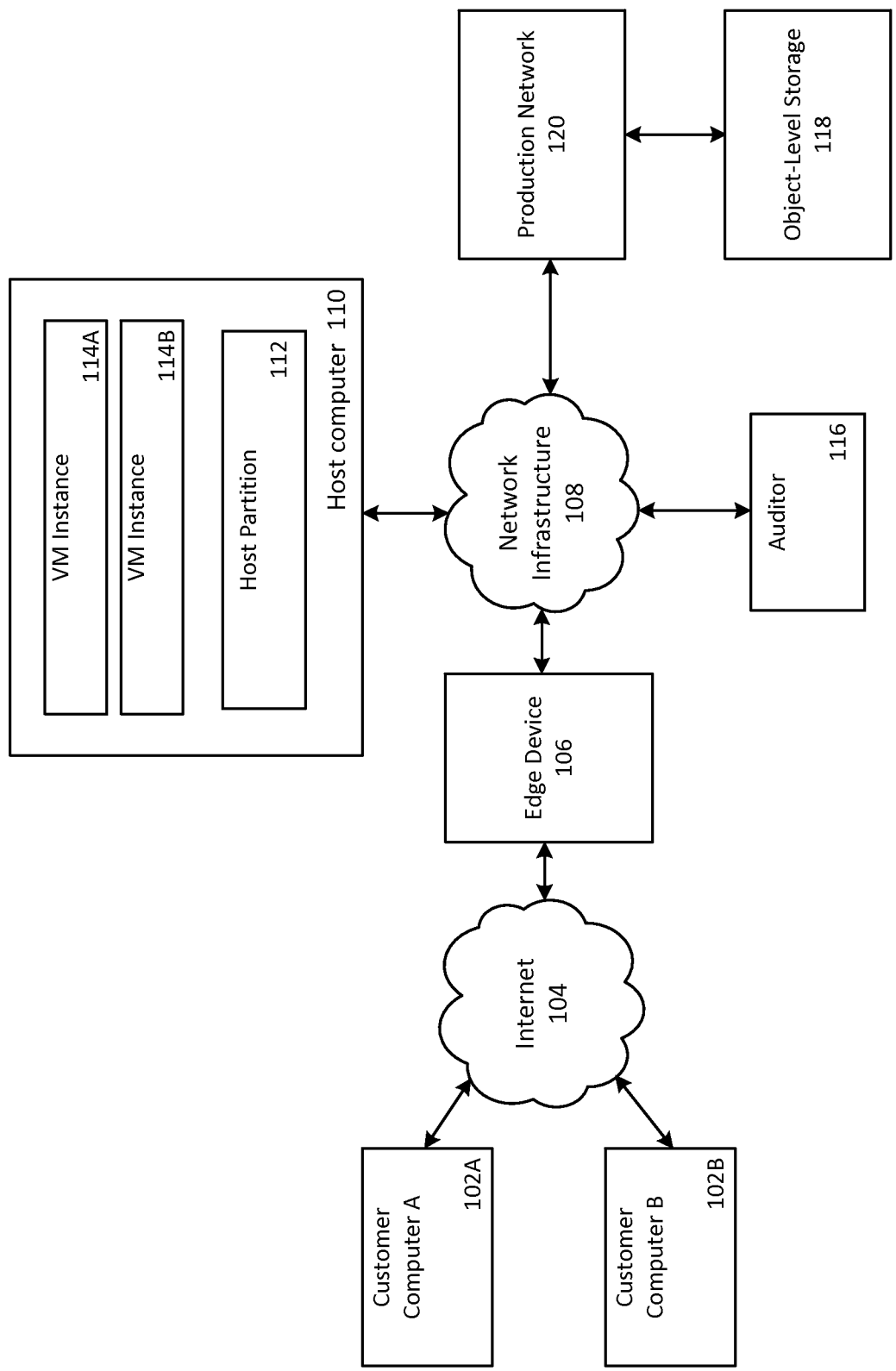
FIG. 1 depicts an example operating environment in which embodiments may be implemented.

The following describes an authoritative IP address vending service, which may be used by internal and external entities to programmatically consume and deploy various types of IP addresses and attributes. Presently, management and deployment of IP addresses within a web services platform may be done manually. Automation of the registration and/or deployment of IP address ranges may speed up the process. Additionally, such automation may reduce the likelihood of human error.

Currently, IP address range assignments may be tracked manually, such as via wikis and spreadsheets. There may be no single, reliable, authoritative source for IP addresses. When deploying new IP address ranges, wikis, and spreadsheets may be updated manually, and multiple teams that work on a web services platform may be emailed notification of the new ranges. Teams then need to schedule deployments for the new ranges, while an administrator needs to ensure that the teams have completed deployment of the IP address ranges by the date requested for deployment. There may be teams that require deployments to their entire server fleet worldwide whenever new IP address ranges are added. Where there are multiple regions in a web services platform and many different types of IP address ranges per region, deployment events may occur fairly frequently and require a large amount of manual effort to attend to. It may be that deploying new IP address ranges can take weeks, depending on the number of teams and regions affected and resource availability. This extended window for IP address deployment may cause multiple issues, including increasing a risk of running out of IP addresses available for customer use, preventing new capacity from going into production and incorrect billing for inter- and intra-region bandwidth.

The present techniques may be utilized to provide a single, authoritative source of all IP address ranges and attributes in a web services platform; to validate or audit an assignment of IP address prefixes; to fully automate the deployment and/or registration of new IP addresses; and provisioning workflow to propagate IP prefixes to other dependent systems. The present techniques may also be used to determine ranges for virtual IP addresses in the web services platform, and this information may be used where there is a billing charge associated with traffic from or to a customer's virtual IP address.

In administering a web services platform, the entity that runs the web services platform may be assigned a range of publicly-accessible Internet Protocol (IP) addresses, and/or may have control of an intranet that is part of the web services platform, and have control of the full range of IP addresses for that intranet. In such a web services platform, an administrator may be tasked with assigning IP addresses or ranges of IP addresses to different sub-portions of the web services platform. For instance, one set of IP address ranges may be assigned to, or reserved for, virtual machine (VM) instances that run on computing nodes (though not every address may be assigned at all times); another set of IP address ranges may be assigned to the computing nodes upon which those VM instances execute; and a third set of IP address ranges may be assigned to a development team that is working on new products or services that are not yet available to customers of the web services platform.

Where these IP addresses and ranges are manually assigned to these different sub-portions of the web services platform by an administrator, managing these assignments may be time consuming, and there may be errors due to the manual managing of these assignments (e.g., typos when entering an IP address). The following describes techniques for auditing these assignments of IP addresses and ranges to ensure that they are being used in the manner intended.

As used herein, "IP address(es)," "range of IP addresses" and "IP address prefix" may be used. It may be appreciated that while operations are described as being performed on a single IP address, this is for simplicity of explanation, and similar techniques may be applied on a range of IP addresses (an IP address prefix, such as 192.168/16, being a special form of a range of IP addresses).

The following will begin with an example operating environment in which determining the status of computing nodes and VM instances corresponding to a customer's computing operations in a web services platform may be determined. After that, example operating procedures that may be implemented in various portions of the web services platform to effectuate determining the status of computing nodes and VM instances corresponding to a customer's computing operations in a web services platform are described.

FIG. 1 depicts an example operating environment in which embodiments may be implemented. More detail about the operating environment including more detail about individual components within the operating environment of FIG. 1 is given with respect to FIGS. 5-7. Generally, the operating environment of FIG. 1 includes a multi-customer web services platform that comprises multiple virtual machine instances executing on multiple host computers, as well as a production network that may perform functions for an entity that implements the web services platform, such as host an e-commerce website.

Customer computer A 102A and customer computer B 102B are computers possessed by customers, which are configured to access the multi-customer web services platform via the Internet 104. In turn, the connection point between the multi-customer web services platform and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are auditor 116, production network 120, object-level storage 118 (via production network 120) and host computer 110.

Host computer 110 is configured to execute one or more virtual machine instances (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail later, auditor 116 may store data on object-level storage 118 in the process of auditing IP addresses (e.g., auditor 116 may store database tables that identify IP address prefixes and a purported use for those prefixes).

As depicted, production network 120 may be used to serve a public web site (such as an e-commerce web site), as well as provide services used internally by an entity that maintains the web services platform (e.g., document management systems or databases that identify the employees of the entity for human resource purposes).

All of these entities (or teams responsible for maintaining those entities or developing specific products) may be assigned IP addresses or IP address prefixes—e.g., a prefix may be reserved for VM instances 114, for production network 120 or for host partition 112 (and there may be multiple host computers 110 each with a host partition 112). Some aspects of this process may be performed manually. The manual aspects of this process may introduce errors—e.g., an administrator manually logging an IP address prefix assignment to a particular team may include a typo in the prefix or in the purpose for which that prefix is being used. There are other ways that errors may be introduced as well. For example, a team may be issued a larger prefix than it, in fact, needs and may have many unused and unneeded IP addresses. Auditor 116 may audit the information that has been entered by an administrator about how an IP address prefix is to be used based on how that information is actually being used. Auditor 116 may accomplish this by querying one or more semi-authoritative sources (e.g., a router that implements a border gateway protocol (BGP) or a domain name service (DNS)) for information about how an IP address is actually being used, and then compare this information with the use manually identified by an administrator. Through this process, auditor 116 may audit the use of IP addresses.

As used herein, a semi-authoritative source may be distinguished from an authoritative source, though it may be appreciated that both semi-authoritative and authoritative sources may be used to audit IP addresses. The sources described above may generally be considered to be semi-authoritative sources. They may generally store information about an IP address that they, themselves, use to route traffic addressed to or from that IP address or that they supply to another entity that uses that information to route traffic addressed to or from that IP address. They may be considered to be semi-authoritative rather than authoritative because, in the case of a conflict between a semi-authoritative source and an authoritative source (such as a root-level DNS server), the authoritative source's information is considered to be correct over the semi-authoritative source's information.

Auditor 116 may be logically divided into multiple components as described herein—Publisher, Registration Auditor, Route Views Auditor and Cloud Auditor. Each of these logical components is described in more detail below.

Publisher may create two files. One file (called a "prefixes table" herein when stored in object-level storage 118) may identify a mapping between a region and a network and a list of IP address prefixes (or a list of one or more IP addresses). A second file may identify a mapping between an IP address prefix and a network and a description of how that prefix is used, an identifier of whether the IP addresses are publicly available, an identifier of whether this prefix is a sub-block of another prefix identified in these files or an identifier of an owner of the prefix. Publisher may create these files, for example, in an eXtensible Markup Language-type (XML) format such as a JavaScript Object Notification (JSON) format.

An example of a JSON file may be:
<border>
<regions>
  <region name="region-1">
    <networks>
      <network name="network-1">
        <publicBlocks>
        <publicBlock>
        <prefix name="A.B.C.D/E" public="PublicIP"/>
        <publicBlock/>
      <publicBlocks/>
      <network/>
    <networks/>
  <region/>
<regions/>

Publisher may upload these files as database tables to object-level storage 118, where object-level storage 118 saves the files with a known filename format—e.g., "publisher-output-$timestamp$".

Registration Auditor may communicate with a whois server to validate registration information. A regional registrar (e.g., ARIN) may not have conflicting data about an origin AS number for a prefix. Registration Auditor may take the prefixes table stored in object-level storage 118 as input and query a public whois server, such as whois.radb.net. An example command to issue to a whois server via a terminal promp may be "whois—h whois.radb.net <prefix from the prefixes table>." Registration Auditor may store an output of its operations in object-level storage 118 in a database table format, using a schema as follows: <prefix, timestamp>→{description, origin_asn, inconsistent_origin, maintainer}. Here, the timestamp identifies a time at which the whois command was run for the corresponding prefix, description is a public description of the prefix, origin_asn is an AS number associated with the prefix, inconsistent_origin is TRUE if the prefix has registration issues (e.g., the prefix is not registered by the entity that operates the web services platform, or different registrars have conflicting information and maintainer is a maintainer object in RADb.

The Route Views Auditor may download a snapshot of Tier-1 BGP exchanges to validate the IP prefixes based on what is advertised through BGP. The Route Views Auditor may take the prefixes table as input. The Route Views Auditor may then download BGP data from a web site that provides it. The Route Views Auditor may then validate the data stored in the prefixes table based on this BGP data. Route Views Auditor may store its output in object-level storage 118 in a table called the prefixes audit table. A schema of this prefixes audit table may be <prefix, timestamp>=>{origin_asn, second_hop_count, advertised, inconsistent_origin_asn}. Here, origin_asn may be the AS number that is advertised for the prefix, second_hop_count may be the number of hops from a known location to the AS of the entity that provides the web services platform, advertised may be a boolean that denotes whether or not the prefix is advertised, and inconsistent_origin_asn may be a boolean that denotes whether a prefix is being advertised using different AS numbers.

Cloud Auditor may check IP addresses against prefixes to validate the IP addresses identified by the prefixes. Cloud Auditor may also validate metadata for each IP address, such as an instance type associated with the IP address, whether the IP address is associated with a virtual private cloud (VPC), whether the IP address is associated with a high performance cluster (HPC), whether the IP address is associated with a host partition of a computing node that supports VM instances or whether the IP address is associated with a VM instance.

Cloud Auditor may take as input information about where in a web services platform IP addresses are used (e.g., within which region or availability zone, as described below) and produce an output as a table stored in object-level storage 118 and called prefixes audit table, using the following schema <prefix, timestamp>=>{coverage, totalip, region, az}. Here, coverage is the number of IP addresses being used, totalip is the total number of IPs (including ones that are not used), region is the region in the web services platform that the prefix belongs to and az is the availability zone in the web services platform to which the prefix belongs. As used herein, a web services platform may be divided into multiple availability zones or regions (for example, an availability zone or region may comprise one or more data centers 502 of FIG. 5) that are generally located in physically separate locations (e.g., one in Seattle and another in Chicago). For the purposes of this disclosure, an availability zone or region may each have a separate IP address space.

In embodiments, auditor 116 may operate on different "views" of the data stored about IP address assignments. Examples of views include: (1) global—a superset of all IP data across all regions; (2) regional—all IP data for a particular region; (3) VM instance public IPs—the public IP blocks for VM instances; (4) VM instance public IP regional—the public IP blocks for VM instances in a given region; (5) VM instance public IP regional NAT—all NAT blocks for a given region; (6) VM instance IP regional VPC—all VPC blocks for a given region; (7) internal IPs for a subset of the web services platform that supports VM instances and/or a subset of the web services platform that provides a block-level storage service; and (8) firewall IP addresses for a production portion of the web services platform.

This collected information may be gathered by auditor 116 and used by auditor 116 to audit the use of IP addresses. Auditing the use of IP addresses in the operating environment of FIG. 1 is described in more detail with respect to the operating procedures of FIG. 2. Auditor 116 may use multiple semi-authoritative sources to audit the use of an IP address, which is described in more detail with respect to the operating procedures of FIG. 3. Additionally, auditor 116 may audit a plurality of IP addresses in a range of IP addresses and, where information is not received for all of those IP addresses, use the information that is received for other IP addresses to audit the remaining IP addresses. This aspect is described in more detail with respect to the operating procedures of FIG. 4.

In embodiments, the various logical auditors of auditor 116 (e.g., Route Views Auditor and Cloud Auditor) may be implemented in series while IP addresses are being provisioned to be available for use to ensure that the steps of the provisioning process have completed successfully. For instance, the provisioning process may involve notifying a domain name service of a URL (uniform resource locator) that corresponds to an IP address, so that a computer that is associated with that IP address may be reached via the URL. The above logical auditors of auditor 116 may be run against the IP address while it is being provisioned. In embodiments, all of the logical auditors are run on the IP address at once in parallel (and this process is repeated). At the beginning of the provisioning process, it may be that most of the logical auditors determine that the IP address is not validated, and as the provisioning process advances, more of these logical auditors may determine that the IP address is validated. Where the IP address has been fully provisioned, it may be that all of these logical auditors may determine that the IP address is validated.

In other embodiments, one logical auditor may be run against the IP address until the result of doing so is that the IP address is validated, and then the other logical auditors may be run against the IP address in series until it is determined that each logical auditor determines that the IP address is validated. Running the logical auditors serially may occur where not every auditor is relevant to every stage of the provisioning process. In other embodiments, the logical auditors may be run serially, and each logical auditor that has already run may continue to run (so, initially the process begins with running one logical auditors, and the process ends with running all of the logical auditors in parallel). This may occur to prevent a scenario where a logical auditor that validates an IP address at one point in the provisioning process may identify that IP address as not being validated later in the provisioning process because something has gone wrong with the provisioning process.

In embodiments, information about the data sent to and received from IP addresses may be validated (and this information may be stored, for example, in a routing device, or obtained by exchanging network traffic with a computing device associated with that IP address). For example, these techniques may be used to determine a maximum transmission unit (MTU; generally, a maximum packet size for network communications) for network communications associated with that IP address. That MTU may indicate a use of that IP address. For example, in a particular system, a MTU for network communications in a high-performance cluster of the system may be larger than for general network traffic. Therefore, when it is determined that the IP address is associated with this higher MTU, that may indicate that the IP address is being used for the high-performance cluster (and when the IP address is associated with the lower MTU, that may indicate that the IP address is not being used for the high-performance cluster).

The auditing process of auditor 116 may be used to effectuate a service where auditor 116 may provide an API (application programming interface) to users of the system that may be utilize to query auditor 116 with a list of IP addresses to determine whether the IP addresses have been verified. For example, auditor 116 may store an indication of which IP addresses have been validated or verified through the auditing process and return verification information to a requestor in a response. In embodiments, auditor 116 may also track which IP addresses that have been determined to not be verified, or for which the result is inconclusive. This information may also be returned to a requestor. Auditor 116 may receive a request for an indication of verified IP addresses from a user at a computing node. Auditor 116 may then send that user an indication of those verified IP addresses. Where auditor 116 stores only verified IP addresses, or for example stores a file that contains only verified IP addresses, auditor 116 may send the requestor an indication of those IP addresses. Where verified IP addresses are stored along with IP addresses that are not verified or that have an inconclusive result (such as where each IP address has a separate row in a database table), auditor 116 may determine the verified IP addresses from among these IP addresses and send an indication of those IP addresses to the requestor.

In embodiments, the requestor may request a subset of IP addresses—e.g. verified IP addresses that are to be used by virtual machine instances, and auditor 116 may determine which verified IP addresses to send to the requestor according to these criteria, and send that subset of verified IP addresses to the requestor. Where there is a confidence level associated with verifying an IP address, as discussed below, auditor 116 may send this confidence level along with an indication of the verified IP addresses.

In example embodiments, auditor 116 may be exposed as a web service. That is to say, the auditor 116 may be coupled or include a web service that exposes a uniform resource locator that serves as an endpoint for the auditor 116. A requestor can send an HTTP or HTTPS request to the endpoint to query auditor 116 for information about IP addresses. The request can be an HTTP or HTTPS request that uses an HTTP verb, such as GET or POST and can indicate that the request is for information about an IP address or a range of IP addresses and pass the IP address or range as a query parameter. In some embodiments the request may also include authentication information, such as a digital signature. This information can be used to determine whether the requestor is authorized to access the IP address information. For example, access control policies can be used to limit the ability of a requestor to access information to only IP addresses they use or manage.

Figure 2:
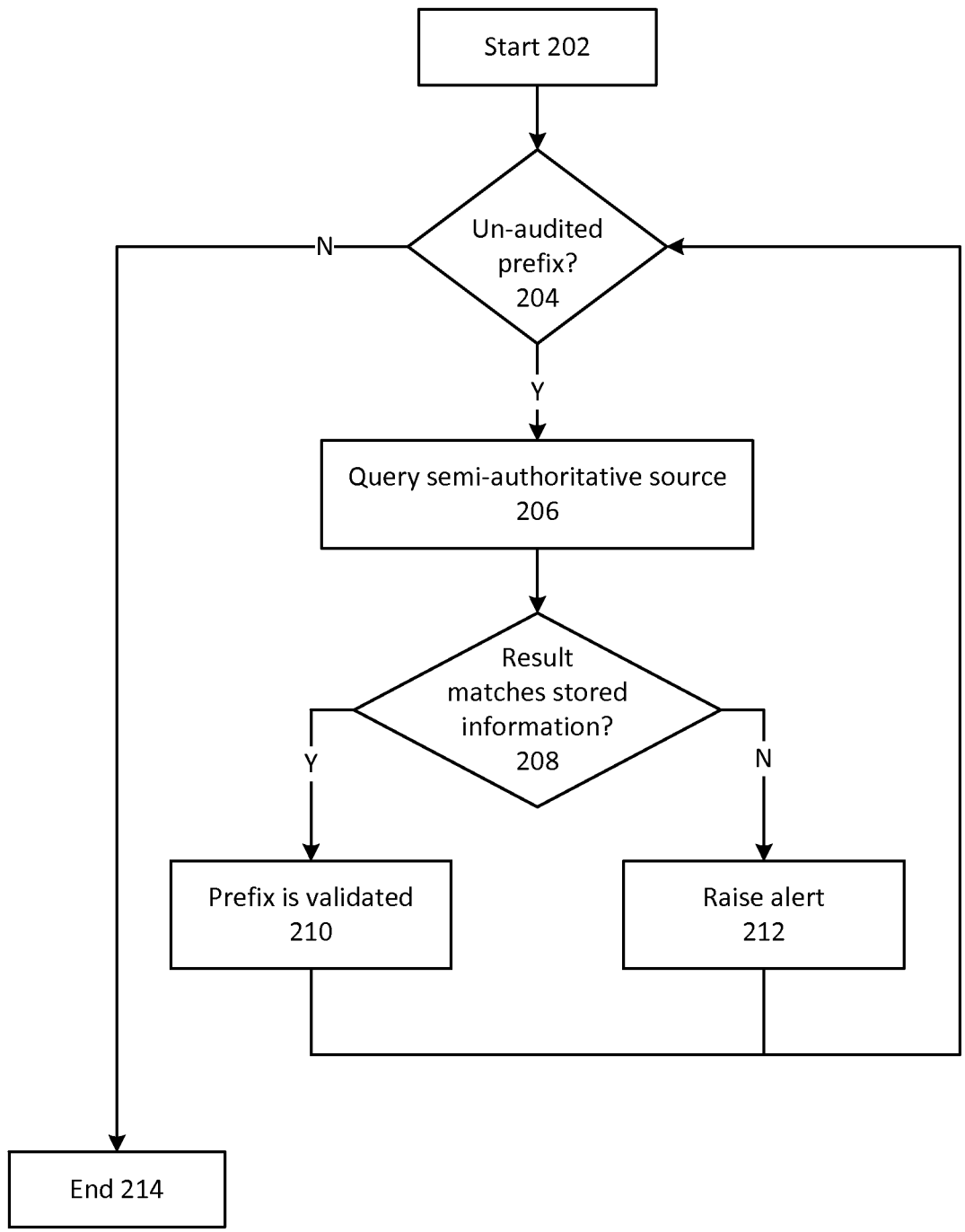
FIG. 2 depicts example operating procedures for auditing an IP address or a range of IP addresses, such as those IP addresses identified by an IP address prefix.

FIG. 2 depicts example operating procedures for auditing an IP address or a range of IP addresses, such as those IP addresses identified by an IP address prefix. It may be appreciated that there are embodiments that implement more, or fewer, operations than depicted in FIG. 2, or that depict the operations of FIG. 2 in a different order than is depicted in FIG. 2. It also may be appreciated that there are embodiments that may implement similar variations of the operations depicted in FIGS. 3-4. In embodiments, the operating procedures of FIG. 2 may be implemented by auditor 116 of FIG. 1 to audit IP addresses and ranges of IP addresses that may be assigned to production network 120, object-level storage 118, VM instances 114A-B, host partition 112, host computer 110 or edge router 106.

The operating procedures of FIG. 2 begin with operation 202 and then move to operation 204. Operation 204 depicts determining whether there are any un-audited IP address prefixes. For example, the Publisher component of auditor 116 described in FIG. 1 may produce a database table in object-level storage 118 that contains rows that identify a prefix, along with information about a particular prefix, such as the sub-network that the prefix operates on or a description of the use of the prefix (e.g., for VM instances, or for a particular team of developers that works on a particular service). When the prefixes that are identified in this table are audited, operation 204 may comprise determining whether there is a prefix that has not yet been audited. Where each prefix is stored in a separate row of the table, this may comprise determining whether there are any rows of the table that have not yet been analyzed. Where there are any un-audited IP address prefixes, an IP address prefix is selected, and the operating procedures of FIG. 2 move to operation 206. Where there are no remaining un-audited IP address prefixes, the operating procedures of FIG. 2 move to operation 214, where the operating procedures of FIG. 2 end.

Operation 206 depicts querying a semi-authoritative source with an IP address of the IP address prefix. Generally, a semi-authoritative source may be a device or process that stores information about an IP address that the source uses to transmit network traffic destined to, or received from, that IP address. A semi-authoritative source may be, for example, edge device 106, which implements a border gateway protocol (BGP) that involves maintaining a table of IP prefixes that designate network reachability among various autonomous systems (AS). Where the semi-authoritative source does implement BGP, querying the source may return the portion of that table that corresponds to the specified IP address or prefix.

The semi-authoritative source also may be, for example, a regional internet registry (RIR) that manages the distribution of internet number resources including IP address space and AS numbers. An AS may be a collection of connected IP routing prefixes under the control of one or more network operators that presents a common, clearly-defined routing policy to the Internet. An ASN (AS number) may be used to then uniquely identify a network on the Internet. Where the semi-authoritative source provides ASNs, querying the source may return an ASN associated with the IP address or prefix.

The semi-authoritative source may also be, for example, a routing assets database (RADb), which comprises a lookup database that provides information about networks. The RADb may store associations between IP addresses and information used to route network traffic to, and from, those IP addresses, such as ASNs. Where the semi-authoritative source is a RADb, querying the source may return an ASN associated with the IP address or prefix.

The semi-authoritative source may also be, for example, a domain name service (DNS). A DNS may comprise a hierarchical distributed naming system for computers, services or any resource connected to the Internet or a private network. It associates various information with domain names assigned to each of the participating entities. For example, a DNS may maintain an association between an IP address and a uniform resource locator (URL) that may be used to identify that IP address. Where the semi-authoritative source is a DNS, querying the source may return a URL associated with the IP address or prefix.

After operation 206, the operating procedures of FIG. 2 move to operation 208. Operation 208 depicts determining whether the result received from querying the semi-authoritative server in operation 206 matches stored information about the IP address. For example, where the semi-authoritative source is DNS, and querying the source returns a URL, this URL may be compared against stored information about the IP address that indicates a use for the IP address. In a web services platform, URLs may be assigned in a well-defined manner, so that the URL indicates the use of a device that the URL identifies. For example, all IP addresses assigned to VM instances may be of the form "vm-instance-XX-web-services-platform.com," where XX is an integer that is unique among URLs for VM instances in the web services platform. Where the URL received from the DNS matches this format, then it may be determined that the result received from querying the semi-authoritative server in operation 208 matches stored information about the IP address. Where the URL received from the DNS differs from this format (e.g., the received URL is in the form of "host-partition-XX-web-services-platform.com"), then it may be determined that the result received from querying the semi-authoritative server in operation 208 matches stored information about the IP address.

In embodiments, operation 208 may not involve determining whether the result received from querying the semi-authoritative server in operation 206 exactly matches stored information about the IP address, but more generally whether the two pieces of information are consistent, or lead to the same conclusion. Using the above example, where the stored information is an identification that the IP address is assigned to a VM instance, and the result received from querying the semi-authoritative server comprises a URL, these two things may not literally match. However, they may be consistent and lead to the same conclusion that the IP address is being used for a VM instance.

Where the result received from querying the semi-authoritative server in operation 208 does match stored information about the IP address, the operating procedures of FIG. 2 move to operation 210. Where result received from querying the semi-authoritative server in operation 208 does not match stored information about the IP address, the operating procedures of FIG. 2 move to operation 212.

Operation 210 depicts determining that the prefix is validated. As depicted, the prefix is determined to be validated where, in operation 208, information from the semi-authoritative source matches information stored about the IP address or prefix. In other embodiments, the process of validating a prefix may be more involved. For example, multiple semi-authoritative sources may be queried (as described with respect to FIG. 3). It may be that all of these sources agree; that information received from at least two sources conflicts with each other; that information is received from at least one semi-authoritative source and no information is received from at least one other semi-authoritative source; or that information is received for some IP addresses within a range of IP addresses identified by a prefix and not received for other IP addresses within that range of IP addresses. These embodiments are described in more detail in FIG. 3. After operation 210, the operating procedures of FIG. 2 return to operation 204, where it is determined if there are any additional un-audited IP address prefixes. If, at operation 204, it is determined that there are no additional un-audited IP address prefixes, the operating procedures of FIG. 2 move to operation 214, where the operating procedures of FIG. 2 end.

Operation 212 depicts determining that the stored information about the prefix is not valid, and raising an alert. As depicted, the prefix is determined to be not valid where, in operation 208, information from the semi-authoritative source does not match information stored about the IP address or prefix. Other embodiments are described in more detail with respect to FIG. 3. After operation 212, the operating procedures of FIG. 2 return to operation 204, where it is determined if there are any additional un-audited IP address prefixes. If, at operation 204, it is determined that there are no additional un-audited IP address prefixes, the operating procedures of FIG. 2 move to operation 214, where the operating procedures of FIG. 2 end.

Figure 3:
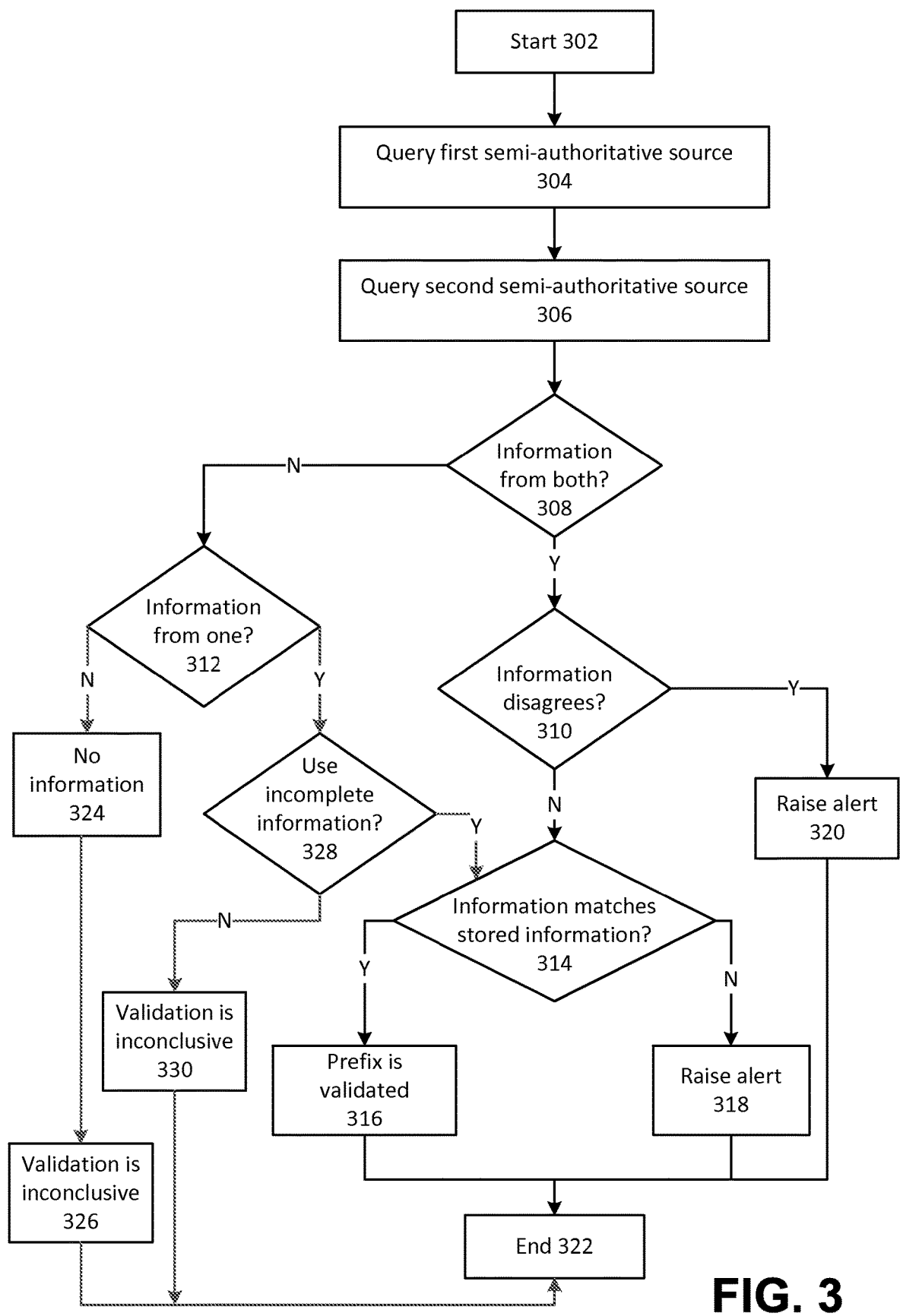
FIG. 3 depicts example operating procedures for auditing an IP address or range of IP addresses using multiple semi-authoritative sources.

FIG. 3 depicts example operating procedures for auditing an IP address or range of IP addresses using multiple semi-authoritative sources. In embodiments, the operating procedures of FIG. 3 may be implemented by auditor 116 of FIG. 1, and may be implemented instead of operating procedures 206-212 of FIG. 2, so that the operating procedures of FIG. 2 may operate using multiple semi-authoritative sources.

The operating procedures of FIG. 3 begin with operation 302, and then move to operation 304. Operation 304 depicts querying a first semi-authoritative source for information about an IP address. Operation 304 may be implemented in a similar manner as operation 206 of FIG. 2. After operation 304, the operating procedures of FIG. 3 move to operation 306.

Operation 306 depicts querying a second semi-authoritative source for information about an IP address. Like operation 304, operation 306 may be implemented in a similar manner as operation 206 of FIG. 2 but directed to a different semi-authoritative source than the semi-authoritative source of operation 304. After operation 306, the operating procedures of FIG. 3 move to operation 308.

Operation 308 depicts determining whether information about the IP address was received from both the first semi-authoritative source and the second semi-authoritative source. It may be that information is received from only one of these two semi-authoritative sources (or neither of these two semi-authoritative sources). Where information is not received from a particular semi-authoritative source, it may be because that semi-authoritative source is currently non-functional (e.g., there is not a functioning network connection between this source and auditor 116) or because the source lacks information about the IP address. The source may lack information about the IP address because the audit of FIG. 3 is taking place shortly after the IP address was put into service and the source has not yet been informed of this.

For example, it may take some amount of time to propagate a correlation between an IP address and a URL to DNS, and where this has not yet occurred, the DNS may not have that association stored, and thus, may not return the URL when queried with the IP address.

In another embodiment, the semi-authoritative source may implement a BGP, but an AS associated with the IP address has not yet advertised this IP address to this authoritative source. In this case, the semi-authoritative source may not be able to return information about the IP address because it has not been informed of information about the IP address.

Given that, it may be that information about the IP address was not received from a semi-authoritative source (1) because the semi-authoritative source did not respond at all; or (2) because the semi-authoritative source did respond, but the response indicated that the semi-authoritative source lacks information about the IP address.

Where it is determined that information about the IP address was received from both the first semi-authoritative source and the second semi-authoritative source, the operating procedures of FIG. 3 move to operation 310. Where it is determined that information about the IP address was not received from both the first semi-authoritative source and the second semi-authoritative source, the operating procedures of FIG. 3 move to operation 312.

Operation 310 depicts determining whether the information about the IP address received from the first semi-authoritative source and the second semi-authoritative source disagrees. Where the information received from the first semi-authoritative source and the second semi-authoritative source is of the same type (e.g., both sources are a DNS and the information received is a URL), this may comprise directly comparing the information received from each source to see if it matches. Using the DNS example, it may be that the information does not match because one DNS has been updated with a new URL for the IP address, but the other DNS has not yet been updated.

Where the information received from the first semi-authoritative source and the second semi-authoritative source is not of the same type (e.g., one source is a DNS that provides a URL, and another source is a RIR that provides an ASN), they may still agree. That is, it may be possible for an IP address to have both the URL provided by the DNS and the ASN provided by the RIR.

Where the information about the IP address received from the first semi-authoritative source and the second semi-authoritative source do agree, the operating procedures of FIG. 3 move to operation 314. Where the information about the IP address received from the first semi-authoritative source and the second semi-authoritative source do not agree, the operating procedures of FIG. 3 move to operation 320.

Operation 312 depicts determining whether information has been received from one of the first semi-authoritative source and the second semi-authoritative source—but not from both sources. Where it is determined that information has not been received from at least one source, then the operating procedures of FIG. 3 move to operation 324 (where it is noted that there is no relevant information available from a queried source) and then to operation 326 where it is determined that the validation process for the IP address or prefix is inconclusive, and then to operation 322, where the operating procedures of FIG. 3 end. As depicted, there are three types of results from validating a prefix or IP address—that the prefix was successfully validated, that the prefix was affirmatively not validated (e.g., operations 318 and 320), and that there is not enough information to either validate or affirmatively not validate the prefix. This third type of results involves determining that the validation process is inconclusive as to the IP address or prefix.

Moving on to the situation where it is determined in operation 312 that information has been received from the one of the first semi-authoritative source and the second semi-authoritative source, the operating procedures of FIG. 3 then move to operation 328. Operation 328 depicts determining whether to use this incomplete information (the information is referred to as being incomplete here because information was not received from both sources). It may be that not all semi-authoritative sources are valued equally. It may be that information local to the web services platform (such as information obtained by Cloud Auditor in FIG. 1) is valued or trusted more than information received from an outside source, such as Registration Auditor, which obtains information from a RADb on the Internet, external to the web services platform.

It may be that, if information is received from the first semi-authoritative source but not from the second semi-authoritative source, then this information will be used to validate the prefix (and the operating procedures of FIG. 3 will move to operation 314). However, it may be that information received from the second semi-authoritative source is less-valued (or less-trusted) than information received from the first semi-authoritative source. So, if information is received from the first semi-authoritative source but not from the second semi-authoritative source, then it may be determined that there is not enough information to validate the prefix. In this case, the operating procedures of FIG. 3 move to operation 330, where it is determined that the validation process for the IP address or prefix is inconclusive, and then to operation 322, where the operating procedures of FIG. 3 end.

It may be appreciated that similar techniques may be applied to embodiments where there are more than two sources that are queried. For example, where there are three sources—A, B, and C—it may be determined that the validation process is inconclusive unless information is received from either A, or both B and C. Similarly, in other embodiments, it may be that there are a minimum number of sources that must respond for any source information to be used, regardless of which sources do respond (in the case depicted in FIG. 3, it may be that the minimum number of sources that must respond is one).

Operation 314 depicts determining whether the information received from one or more semi-authoritative sources matches stored information about the IP address. In embodiments, operation 314 may be implemented in a similar manner as operation 208 of FIG. 2 is implemented. Where the information received from one or more semi-authoritative sources does match stored information about the IP address, the operating procedures of FIG. 3 move to operation 316. Where the information received from one or more semi-authoritative sources does not match stored information about the IP address, the operating procedures of FIG. 3 move to operation 318.

Operation 316 depicts determining that the information stored about the IP address is validated. In embodiments, operation 316 may be implemented in a similar manner as operation 210 of FIG. 2 is implemented. After operation 316, the operating procedures of FIG. 3 move to operation 322, where the operating procedures of FIG. 3 end.

Operation 318 depicts determining that the information stored about the IP address is not validated and raising an alert. In embodiments, operation 318 may be implemented in a similar manner as operation 212 of FIG. 2 is implemented. After operation 318, the operating procedures of FIG. 3 move to operation 322, where the operating procedures of FIG. 3 end.

Operation 320 depicts determining that the information about the IP address received from the first semi-authoritative source and the second semi-authoritative source disagrees, and in response, raising an alert. In embodiments, information received from the semi-authoritative sources disagreeing may be considered more than just grounds for determining that the IP address is not validated. Rather, it may be indicative of a possibility of some greater problem with the network, and it may be determined that, in such cases, a network administrator should be alerted of this event so that he or she may investigate it in more detail. In this manner, the alert raised in operation 320 may differ from the alert about the IP address not being validated that is raised in operation 318. After operation 320, the operating procedures of FIG. 3 move to operation 322, where the operating procedures of FIG. 3 end.

Figure 4:
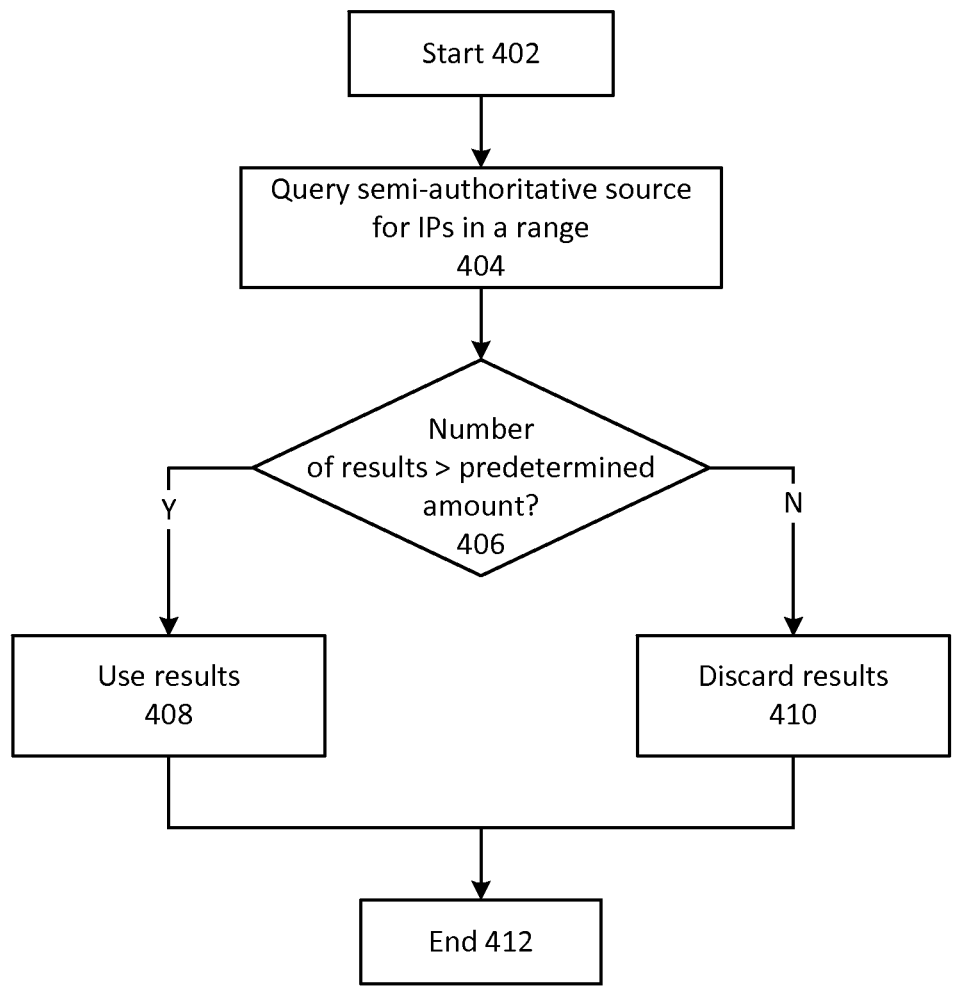
FIG. 4 depicts example operating procedures for auditing multiple IP addresses within a range of IP addresses.

FIG. 4 depicts example operating procedures for auditing multiple IP addresses within a range of IP addresses. In embodiments, the operating procedures of FIG. 4 may be implemented by auditor 116 of FIG. 1. In embodiments, the operating procedures of FIG. 4 may be implemented in conjunction with the operating procedures of FIGS. 2-3. For example, the operating procedures of FIG. 4 may be implemented instead of operation 206 of FIG. 2, or instead of operation 304 or operation 306 of FIG. 3. The operating procedures of FIG. 4 begin with operation 402, and then move to operation 404.

Operation 404 depicts querying a semi-authoritative source for each of multiple IP addresses in a range of IP addresses, such as each of multiple IP addresses within an IP address prefix. In embodiments, operation 404 may be implemented in a manner similar to operation 206 of FIG. 2, but for multiple IP addresses or a range of IP addresses, rather than for a single IP address, as described with respect to operation 206. After operation 404, the operating procedures of FIG. 4 move to operation 406.

Operation 406 depicts determining whether a number of results received from the semi-authoritative source is greater than a predetermined amount. It may be, for instance, that a DNS is queried for a URL corresponding to each of 1,000 IP addresses. And it may be that the DNS has information for 800 of those IP addresses and does not have information for the other 200 IP addresses. In cases like this, a threshold predetermined amount may exist that the number of results received from the semi-authoritative source must meet for the results to be used in further auditing the IP address assignments. For example, the threshold may be 75% of queried IP addresses must produce a corresponding result. In embodiments, this predetermined amount may be set by an administrator and may vary by the type of semi-authoritative source (e.g., there may be a different predetermined amount for results obtained from a DNS than for results obtained from a BGP device). This predetermined amount may vary based on the number of IP addresses queried. For example, if fewer than 20 IP addresses are queried, the predetermined number may be 100%, but the predetermined number may be 75% for 20 or more IP addresses queried.

In other embodiments, a result returned by a semi-authoritative source for a range of IP addresses (or for a single IP address) may be a confidence level that the IP prefix is in use. For example, the source is able to positively identify that 30% of IP addresses within an IP prefix are in use according to the source's records, then the source may return a confidence level of 30% that the IP prefix as a whole is in use. In other embodiments, the confidence level may vary depending on which IP addresses in the range are in use according to the source's records. For example, the source may identify that all IP addresses within a /16 prefix are in use, save for those IP addresses within a particular /24. This may be more likely to indicate that that particular /24 was not assigned and put into use than if the IP addresses that do not appear to be in use are spread more evenly throughout the /16 prefix. In such a scenario, the source may associate a lower confidence level with the /24 prefix not appearing to be in use than if the IP addresses that do not appear to be in use are spread more evenly throughout the /16 prefix. In other embodiments, the source may send two indications— one indication that the /24 prefix does not appear to be in use, and another indication that the rest of that /16 prefix does appear to be in use.

Time may be used as a factor in determining a confidence level. Where the result of validating an IP address varies over time (e.g., 60% of the time the IP address is validated, 10% of the time the IP address is determined to be not validated, and 30% of the time the result is inconclusive), the confidence level may be lower than where the result of validating the IP address is more consistent over time. Similarly, the time domain may more generally be used in validating IP addresses, with results being aggregated over time. It may be that there are three routes for network traffic, but all three routes are not ever seen at the same time. By aggregating the results of auditing an IP address over time, all three routes may be aggregated, and then collectively analyzed to validate the IP address.

Where the number of results received from the semi-authoritative source is at least as much as the predetermined amount, the operating procedures of FIG. 4 move to operation 408. Where the number of results received from the semi-authoritative source is not greater than the predetermined amount, the operating procedures of FIG. 4 move to operation 410.

Operation 408 depicts using the results received by querying the semi-authoritative source in operation 404. The results received by querying the semi-authoritative source may be used because the number of these results received was at least a threshold amount, as determined in operation 406. When the results received are to be used, they may be used in a manner similar to operations 208-212 of FIG. 2, where the results are compared with stored information about the IP address to see if these two pieces of information match.

In embodiments where not all IP addresses queried have corresponding results, it may be that the information about other IP addresses that is received is used to audit the IP addresses for which no information was received. For example, there may be 1,000 IP addresses queried to a DNS, 800 results are received, and all 800 results identify URLs that match the type of use of the IP address indicated in the stored information (e.g., the URLs for VM instances all have "vm-instance" in the URL and that is the case for each URL here). In this case, all 800 IP addresses for which results are received may be considered validated. Additionally, the other 200 IP addresses in the range of IP addresses may be considered to be validated because every IP address in the range that was able to be audited was validated. That is, the validation of these 200 IP addresses may be inferred.

In other embodiments, a confidence level may be assigned to the validation of IP addresses for which no information was returned. Using the above example, a confidence level may be 80%, because 80% of the IP addresses in this range were successfully validated. In other embodiments, a calculation involving the percentage of addresses for which no information was received, the percentage of addresses that were audited and found to be valid, and the percentage of addresses that were audited and found to be invalid may be made, and the confidence level assigned based on this calculation. After operation 408, the operating procedures of FIG. 4 move to operation 412, where they end.

Operation 410 depicts discarding the results received by querying the semi-authoritative source in operation 404. The results received by querying the semi-authoritative source in operation 404 may be discarded because the number of results received was not at least a predetermined number relative to the number of IP addresses queried. After operation 408, the operating procedures of FIG. 4 move to operation 412, where they end.

Figure 5:
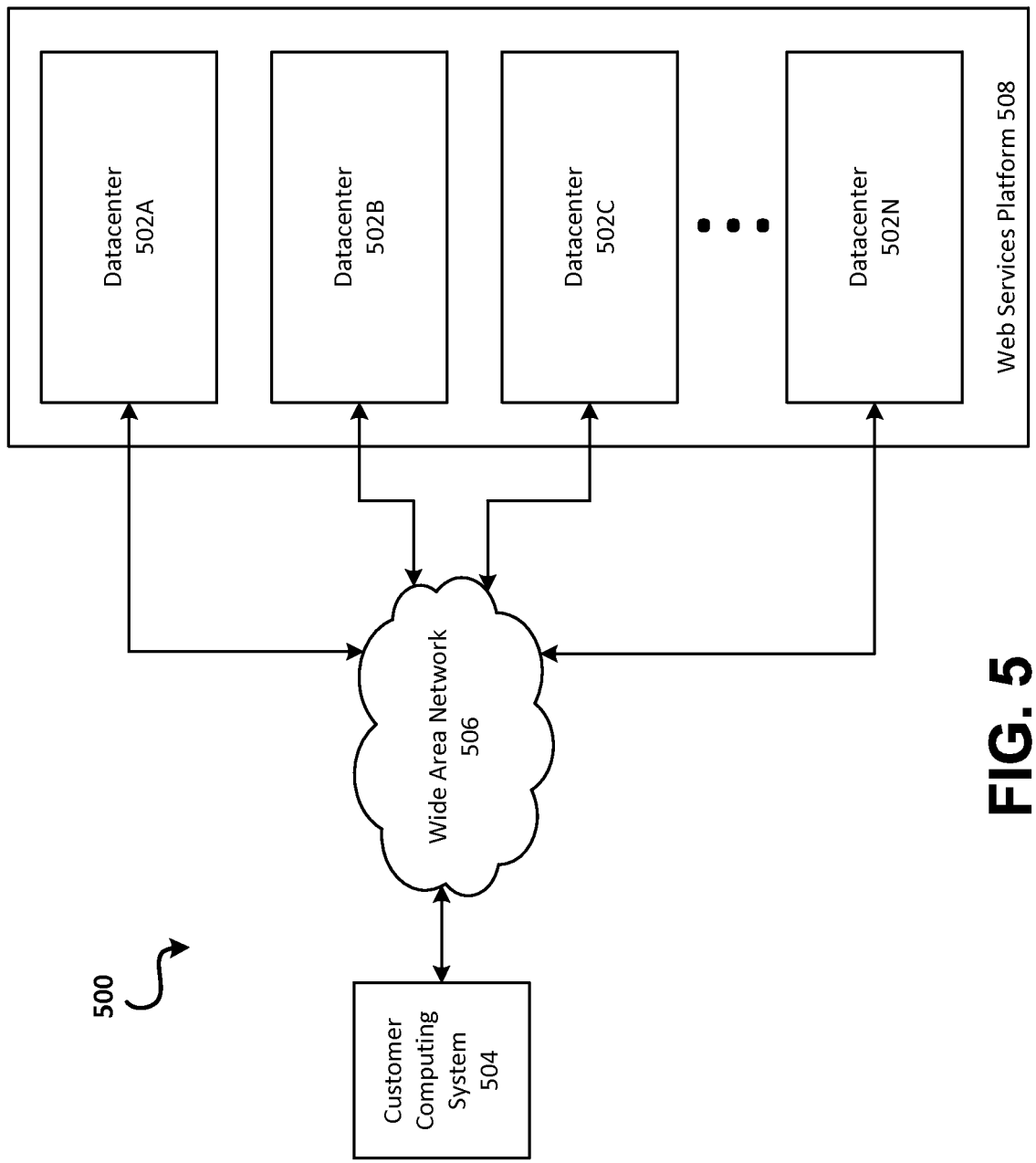
FIG. 5 depicts an example of a suitable computing environment in which embodiments described herein may be implemented.
Figure 6:
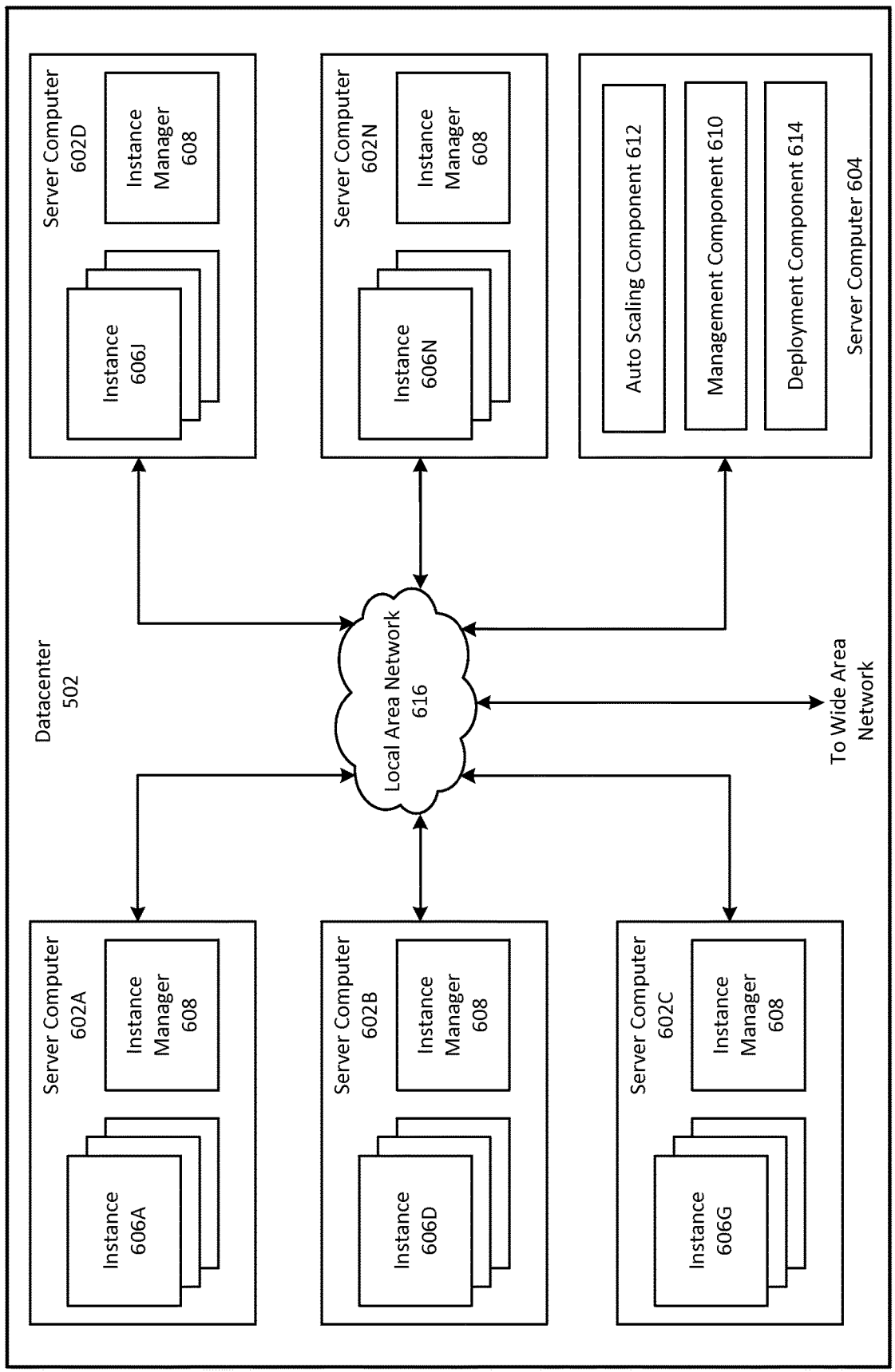
FIG. 6 depicts a computing system diagram that illustrates one configuration for datacenter 602 that implements web services platform 508.
Figure 7:
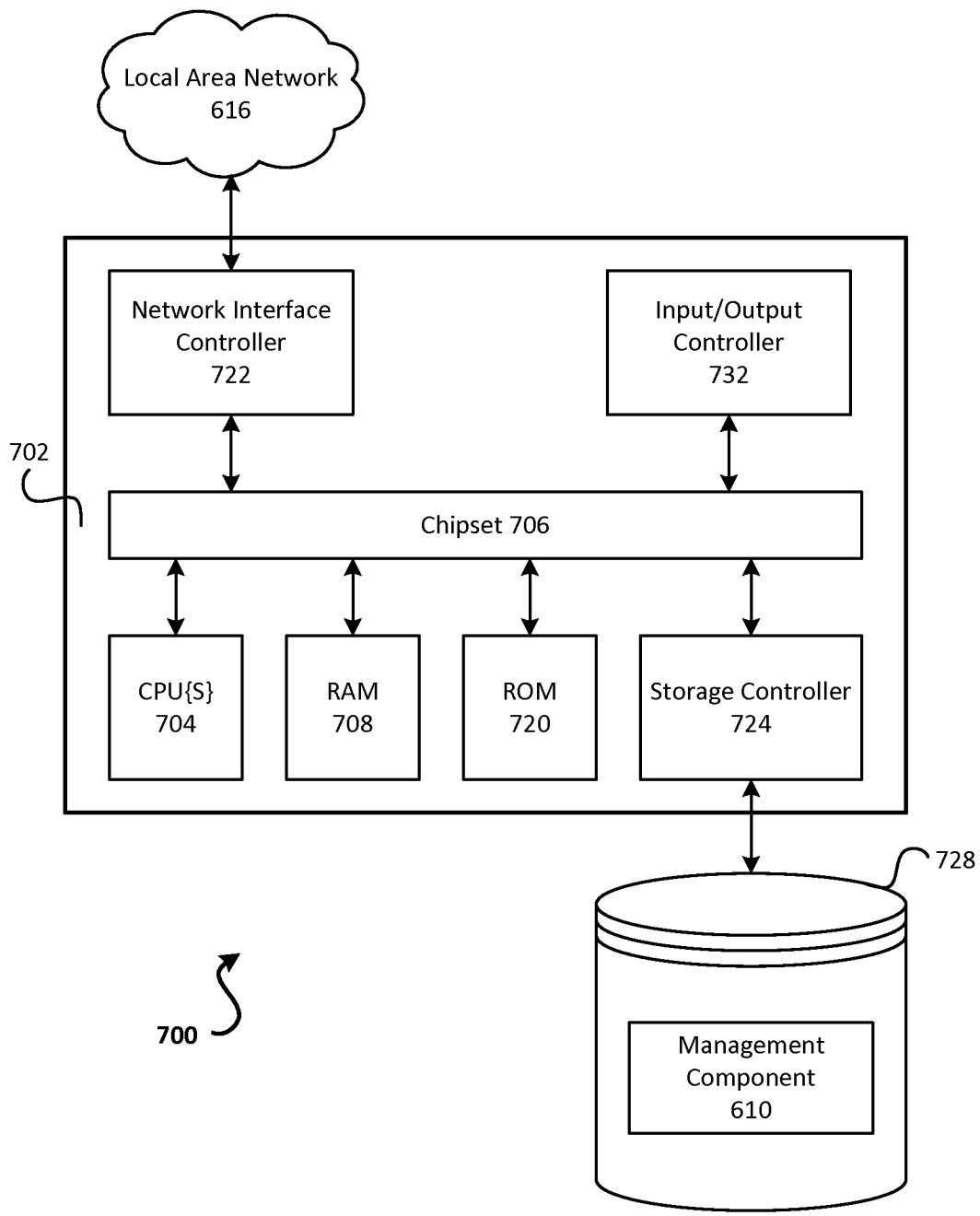
FIG. 7 depicts an example computer architecture for a computer 600 capable of executing the above-described software components.

FIGS. 5-7 are similar to FIG. 1 in that they depict example operating environments in which embodiments disclosed herein may be implemented, and these figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter.

It may be appreciated that these operating environments of FIGS. 5-7 may be used to implement aspects of the operating environment of FIG. 1. For example, edge device 106, host computer 110, and auditor 116 may be implemented in a datacenter 502 of FIG. 5, or across multiple datacenters 502 of FIG. 5. Likewise, Internet 104 of FIG. 1 may be wide area network 506 of FIG. 5, and customer computer-A 102A and customer computer-B 102B each may be customer computing system 504 of FIG. 5. Production network 120 of FIG. 1 may be implemented as one or more data centers 502 of FIG. 5, with object-level storage 118 being implemented as one or more server computers 602 of FIG. 6 (which, in turn, are part of a data center 502).

FIG. 5 depicts an example of a suitable computing environment in which embodiments described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508, for implementing virtual clouds and for providing on-demand access to compute resources such as virtual machine instances. Web services platform 508 can provide compute resources for executing applications on a permanent or an as-needed basis and may be configured as a private network. These compute resources may include various types of resources such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by web services platform 508 may be enabled by one or more datacenters 502A-502N, which may be referred herein singularly as "datacenter 502" or in the plural as "datacenters 502." Datacenters 502 may be facilities that house and operate computer systems and associated components and may include redundant and backup power, communications, cooling and security systems. Datacenters 502 may be located in a same geographical area, such as in a same facility and may be interconnected using private networks, such as high-speed fiber optic networks, controlled and managed by a service provider of web services platform 508. Datacenters 502 may also be distributed across geographically disparate locations and may be interconnected in part using public networks such as the Internet. One illustrative configuration for datacenter 502 that implements the concepts and technologies disclosed herein is described below with regard to FIG. 6.

Entities of web services platform 508 may access the compute resources provided by datacenters 502 over a wide-area network ("WAN") 506. Although a WAN is illustrated in FIG. 5, it should be appreciated that a local-area network ("LAN"), the Internet or any other networking topology known in the art that connects datacenters 502 to remote entities and other users may be utilized. It should also be appreciated that combinations of such networks may also be utilized.

An entity or other entities that are customers of web services platform 508 may utilize a computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box or any other computing node.

As is described in greater detail below, customer computing system 504 may be utilized to configure aspects of the compute resources provided by web services platform 508. In this regard, web services platform 508 may provide a Web interface through which aspects of its operation may be configured through the use of a Web browser application program executing on customer computing system 504. Alternatively, a stand-alone application program executing on customer computing system 504 may access an application programming interface ("API") exposed by web services platform 508 for performing the configuration operations. Other mechanisms for configuring the operation of web services platform 508, including launching new virtual machine instances on web services platform 508, may also be utilized.

According to embodiments disclosed herein, capacities of purchased compute resources provided by web services platform 508 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of web services platform 508 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in web services platform 508.

Web services platform 508 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 6 depicts a computing system diagram that illustrates one configuration for datacenter 502 that implements web services platform 508. With regards to elements of the web services platform previously described with respect to FIG. 1, host computer may be a server computer 602 of FIG. 6 (which itself may be computer 700 of FIG. 7), host partition 112 may be an instance of instance manager 608 (where a host partition serves a hypervisor-type role), and VM instances 114A, 114B, and 114C may each be an instance 606 of FIG. 6. Network infrastructure 108 of FIG. 1 may be local area network 616 of FIG. 6, and status monitor 116 of FIG. 1 may be server computer 604 of FIG. 6.

The example datacenter 502 shown in FIG. 6 may include several server computers 602A-602N, which may be referred herein singularly as "server computer 602" or in the plural as "server computers 602," for providing compute resources for hosting virtual clouds and for executing applications. Server computers 602 may be standard tower or rack-mount server computers configured appropriately for providing the compute resources described above. For instance, in one implementation server computers 602 may be configured to provide instances 606A-606N of compute resources.

Instances 606A-606N, which may be referred herein singularly as "instance 606" or in the plural as "instances 606," may be virtual machine instances. As known in the art, a virtual machine instance is an instance of a software implementation of a machine (i.e., a computer) that executes programs like a physical machine. In the example of virtual machine instances, each server 602 may be configured to execute an instance manager 608 capable of executing the instances. Instance manager 608 may be a hypervisor or another type of program configured to enable the execution of multiple instances 606 on a single server 602, for example. As discussed above, each of instances 606 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 502 shown in FIG. 6 may also include a server computer 604 reserved for executing software components for managing the operation of datacenter 502, server computers 602 and instances 606. In particular, server computer 604 may execute a management component 610. As discussed above, working between FIG. 5. and FIG. 6, an entity of web services platform 508 may utilize customer computing system 504 to access management component 610 to configure various aspects of the operation of web services platform 508 and instances 606 purchased by the entity. For example, the entity may purchase instances and make changes to the configuration of the instances. The entity may also specify settings regarding how the purchased instances are to be scaled in response to demand. The entity may also provide requests to launch instances to management component 610.

As also described briefly above, an auto scaling component 612 may scale instances 606 based upon rules defined by an entity of web services platform 508. For example, auto scaling component 612 may allow an entity to specify scale up rules for use in determining when new instances should be instantiated and scale down rules for use in determining when existing instances should be terminated.

Auto scaling component 612 may execute on a single server computer 604 or in parallel across multiple server computers 602 in web services platform 508. In addition, auto scaling component 612 may consist of a number of subcomponents executing on different server computers 602 or other computing nodes in web services platform 508. Auto scaling component 612 may be implemented as software, hardware or any combination of the two. Auto scaling component 612 may monitor available compute resources in web services platform 508 over an internal management network, for example.

As discussed briefly above, datacenter 502 may also be configured with a deployment component 614 to assist entities in the deployment of new instances 606 of compute resources. Deployment component 614 may receive a configuration from an entity that includes data describing how new instances 606 should be configured. For example, the configuration may specify one or more applications that should be installed in new instances 606, provide scripts and/or other types of code to be executed for configuring new instances 606, provide cache warming logic specifying how an application cache should be prepared and other types of information.

Deployment component 614 may utilize the entity-provided configuration and cache warming logic to configure, prime and launch new instances 606. The configuration, cache warming logic and other information may be specified by an entity using management component 610 or by providing this information directly to deployment component 614. Other mechanisms may also be utilized to configure the operation of deployment component 614.

In the example datacenter 502 shown in FIG. 6, an appropriate LAN (local area network) 616 may be utilized to interconnect server computers 602A-602N and server computer 604. LAN 616 may also be connected to WAN 506 illustrated in FIG. 5. It should be appreciated that the network topology illustrated in FIGS. 5 and 6 has been greatly simplified and that many more networks and networking devices may be utilized to interconnect the various computing systems disclosed herein. Appropriate load balancing devices or software modules may also be utilized for balancing a load between each of datacenters 502A-502N, between each of server computers 602A-602N in each datacenter 502 and between instances 606 purchased by each entity of web services platform 508. These network topologies and devices should be apparent to those skilled in the art.

It should be appreciated that datacenter 502 described in FIG. 6 is merely illustrative and that other implementations may be utilized. In particular, functionality described herein as being performed by management component 610, auto scaling component 612 and deployment component 614 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 7 depicts an example computer architecture for a computer 700 capable of executing the above-described software components. With regard to the example web services platform described with respect to FIG. 1, host computer 110 and auditor 116, as well as customer computer-A 102A, and customer computer-B 102B may each be implemented in computer 700 of FIG. 7.

The computer architecture shown in FIG. 7 illustrates a conventional server computer, workstation, desktop computer, laptop, tablet, network appliance, PDA, e-reader, digital cellular phone or other computing node, and may be utilized to execute any aspects of the software components presented herein described as executing within datacenters 502A-702N, on server computers 602A-602N, on the customer computing system 504 or on any other computing system mentioned herein.

Computer 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPUs 704 may be standard programmable processors that perform arithmetic and logical operations necessary for the operation of computer 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 706 may provide an interface between CPUs 704 and the remainder of the components and devices on the baseboard. Chipset 706 may provide an interface to a random access memory ("RAM") 708 used as the main memory in computer 700. Chipset 706 may further provide an interface to a computer-readable storage medium such as a read-only memory ("ROM") 720 or non-volatile RAM ("NVRAM") for storing basic routines that may help to start up computer 700 and to transfer information between the various components and devices. ROM 720 or NVRAM may also store other software components necessary for the operation of computer 700 in accordance with the embodiments described herein.

Computer 700 may operate in a networked environment using logical connections to remote computing nodes and computer systems through network 616. Chipset 706 may include functionality for providing network connectivity through a network interface controller ("NIC") 722, such as a gigabit Ethernet adapter. NIC 722 may be capable of connecting the computer 700 to other computing nodes over network 616. It should be appreciated that multiple NICs 722 may be present in computer 700, connecting the computer to other types of networks and remote computer systems.

Computer 700 may be connected to a mass storage device 728 that provides non-volatile storage for the computer. Mass storage device 728 may store system programs, application programs, other program modules and data which have been described in greater detail herein. Mass storage device 728 may be connected to computer 700 through a storage controller 724 connected to chipset 706. Mass storage device 728 may consist of one or more physical storage units. Storage controller 724 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 700 may store data on mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

For example, computer 700 may store information to mass storage device 728 by issuing instructions through storage controller 724 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 700 may further read information from mass storage device 728 by detecting the physical states or characteristics of one or more particular locations within the physical storage units.

In addition to mass storage device 728 described above, computer 700 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 700.

By way of example and not limitation, computer-readable storage media may include volatile and non-volatile, transitory and non-transitory, removable and non-removable media implemented in any method or technology. Computer-readable storage media includes but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 728 may store an operating system utilized to control the operation of the computer 700. According to one embodiment, the operating system comprises a version of the LINUX operating system. According to another embodiment, the operating system comprises a version of the WINDOWS® SERVER operating system from the MICROSOFT Corporation. According to further embodiments, the operating system may comprise a version of the UNIX operating system. It should be appreciated that other operating systems may also be utilized. Mass storage device 728 may store other system or application programs and data utilized by computer 700, such as management component 610 and/or the other software components described above.

Mass storage device 728 or other computer-readable storage media may also be encoded with computer-executable instructions, which, when loaded into computer 700, transforms the computer from a general-purpose computing system into a special-purpose computer capable of implementing the embodiments described herein. These computer-executable instructions transform computer 700 by specifying how CPUs 704 transition between states, as described above. Computer 700 may have access to computer-readable storage media storing computer-executable instructions, which, when executed by computer 700, may perform operating procedures depicted in FIGS. 2-4.

Computer 700 may also include an input/output controller 732 for receiving and processing input from a number of input devices, such as a keyboard, a mouse, a touchpad, a touch screen, an electronic stylus or other type of input device. Similarly, input/output controller 732 may provide output to a display, such as a computer monitor, a flat-panel display, a digital projector, a printer, a plotter or other type of output device. It will be appreciated that computer 700 may not include all of the components shown in FIG. 7, may include other components that are not explicitly shown in FIG. 7 or may utilize an architecture completely different than that shown in FIG. 7.

As described herein, a computing node may be a physical computing node, such as computer 700 of FIG. 7. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for validating a stored association between an IP address and a use for the IP address, comprising:
a memory bearing instructions that, upon execution by a processor, cause the system at least to:
obtain information about the IP address from at least one source of information about IP addresses;
determine, based on the stored association, data indicating the use for the IP address;
determine from the information whether the IP address is being used in a manner identified by the use for the IP address based at least in part on a determination of whether the information about the IP address received from at least one source matches at least one criteria determined based on the data indicating the use;
store an indication of whether the IP address is being used in a manner identified by the use for the IP address in a memory;
obtain information about a second IP address from the at least one source of information about IP addresses wherein the IP address and the second IP address belong to a range of IP addresses; and
determine whether the second IP address is being used in a manner identified by the use for the second IP address based at least in part on the information about the IP address received from the at least one source.

2. The system of claim 1, wherein the at least one source of information about IP addresses uses the IP addresses to route network traffic that is directed to or from IP addresses, or translates domain names to the IP addresses.

3. The system of claim 1, wherein at least one source of information about IP addresses comprises a computing node that maintains a correlation between IP addresses and network reachability for an autonomous system (AS), and wherein the information about the IP address received from at least one source comprises information about network reachability for an AS for the IP address.

4. The system of claim 1, wherein at least one source of information about IP addresses comprises a computing node that maintains a correlation between IP addresses and uniform resource locators (URLs), and wherein the information about the IP address received from at least one source comprises information about a URL that corresponds to the IP address.

5. The system of claim 1, wherein the range of IP addresses comprises an IP address prefix.

6. The system of claim 1, wherein the memory further bears instructions that, upon execution by the processor, cause the system at least to:
in response to determining that the IP address is not being used in a manner identified by the use for the IP address, raise an alert to an administrator of the system.

7. The system of claim 1, wherein the instructions that, upon execution by the processor, cause the system at least to obtain information about the IP address from the at least one source of information about IP addresses further cause the system at least to:
obtain first information about the IP address from a first source of information about IP addresses;
obtain second information about the IP address from a second source of information about IP addresses; and
wherein the instructions that, upon execution by the processor, cause the system at least to determine whether the IP address is being used in the manner identified by the use for the IP address further cause the system to at least:
determine whether the IP address is being used in the manner identified by the use for the IP address based at least in part on the information about the IP address received from the first source and the information about the IP address received from the second source.

8. The system of claim 7, wherein the memory further bears instructions that, upon execution by the processor, cause the system at least to:
in response to determining the information about the IP address received from the first source and the information about the IP address received from the second source conflict, raise an alert to an administrator of the system.

9. The system of claim 1, wherein the instructions that, upon execution by the processor, cause the system at least to obtain information about the IP address from at least one source of information about IP addresses further cause the system at least to:

obtain first information about the IP address from a first source of information about IP addresses;

obtain second information about the IP address from a second source of information about IP addresses;

determine that the information about the IP address received from the second source indicates that the second source does not identify how the IP address is being used; and wherein the instructions that, upon execution by the processor, cause the system at least to determine whether the IP address is being used in the manner identified by the use for the IP address further cause the system to at least:

determine whether the IP address is being used in the manner identified by the use for the IP address based at least in part on the information about the IP address received from the first source, and independent of the information about the IP address received from the second source.

10. The system of claim 1, wherein the memory further bears instructions that, upon execution by the processor, cause the system at least to:

determine that the IP address is being used in a manner identified by the use for the IP address;

in response to receiving a request from a computing node via a communications network for an indication of verified IP addresses, send the computing node an indication of the IP address based at least in part on determining that the IP address is being used in a manner identified by the use for the IP address.

11. A non-transitory computer-readable medium for validating a stored association between a network address and a use for the network address, bearing compute r-readable instructions that, when executed on a computer, cause the computer to perform operations comprising:

obtaining information about the network address from at least one source of information about network addresses;

determine, based on the stored association, data indicating the use for the network address;

determining whether the network address is being used in a manner identified by the use for the network address based at least in part on a determination of whether the information about the network address received from the at least one source matches at least one criteria determined based on the data indicate the use; and returning indication of whether the network address is being used in the manner identified by the use for the network address to a request or in response to a web services request obtaining information about a second network address from the at least one source of information about network addresses wherein the network address and the second network address belong to a range of network addresses; and determine whether the second network address is being used in a manner identified by the use for the second network address based at least in part on the information about the network address received from the at least one source.

12. The non-transitory computer-readable medium of claim 11, wherein at least one source of information about network addresses maintains information about network addresses that at least one source of information uses to route network traffic that is directed to or from network addresses, or that sends data to a computing node that uses the data to route network traffic that is directed to or from network addresses.

13. The non-transitory computer-readable medium of claim 11, wherein at least one source of information about network addresses comprises a computing node that maintains a correlation between network addresses and network reachability for an autonomous system (AS), and wherein the information about the network address received from the at least one source comprises information about network reachability for an AS for the network address.

14. The non-transitory computer-readable medium of claim 11, wherein at least one source of information about network addresses comprises a computing node that maintains a correlation between network addresses and uniform resource locators (URLs), and wherein the information about the network address received from at least one source comprises information about a URL that corresponds to the network address.

15. The non-transitory computer-readable medium of claim 11, further bearing computer-readable instructions that, when executed on the computer, cause the computer to perform operations comprising:

in response to determining that the network address is not being used in a manner identified by the use for the network address, raising an alert to an administrator.

16. The non-transitory computer-readable medium of claim 11, wherein obtaining information about the network address from at least one source of information about network addresses further comprises:

obtain first information about the network address from a first source of information about network addresses;

obtain second information about the network address from a second source of information about network addresses; and wherein determining whether the network address is being used in the manner identified by the use for the network address further comprises:

determining whether the network address is being used in the manner identified by the use for the network address based at least in part on the information about the network address received from the first source and the information about the network address received from the second source.

17. The non-transitory computer-readable medium of claim 11, wherein obtaining information about the network address from at least one source of information about network addresses further comprises:

obtain first information about the network address from a first source of information about network addresses;

obtain second information about the network address from a second source of information about network addresses;

determining that the information about the network address received from the second source indicates that the second source does not identify how the network address is being used; and wherein determining whether the network address is being used in the manner identified by the use for the network address further comprises:

determining whether the network address is being used in the manner identified by the use for the network address based at least in part on the information about the network address received from the at first source, and independent of the information about the network address received from the second source.

* * * * *